United States Patent [19]
Ziauddin

[11] Patent Number: 6,029,163
[45] Date of Patent: Feb. 22, 2000

[54] METHODS FOR COLLECTING QUERY WORKLOAD BASED STATISTICS ON COLUMN GROUPS IDENTIFIED BY RDBMS OPTIMIZER

[75] Inventor: Mohamed Ziauddin, Fremont, Calif.

[73] Assignee: Oracle Corporation, Redwood Shores, Calif.

[21] Appl. No.: 09/164,400

[22] Filed: Sep. 30, 1998

Related U.S. Application Data

[63] Continuation of application No. 08/796,779, Feb. 10, 1997.
[51] Int. Cl.$^7$ .................................................. G06F 17/30
[52] U.S. Cl. .................................................................. 707/2
[58] Field of Search ..................................... 707/1, 2, 3, 7

[56] References Cited

U.S. PATENT DOCUMENTS 5,598,559  1/1997  Chaudhuri .................................. 707/2

OTHER PUBLICATIONS

"Performing Group–By before Join," Yan et al., Proceedings of the 10th International Conference on Data Engineering, Houston, Texas, USA, pp. 89–100, Feb. 14–18, 1994.

*Primary Examiner*—Jack M. Choules
*Assistant Examiner*—Hosain T. Alam
*Attorney, Agent, or Firm*—Wagner, Murabito & Hao LLP

[57] ABSTRACT

Methods for collecting query workload based statistics within a relational database management system (RDBMS) and for identifying columns for which statistics collection is to be performed. The novel system collects workload statistics that are dependent on multiple columns, rather than merely single columns. Multi-column statistic generation provides more accurate results for columns having correlated data, and therefore leads to better estimated cost analysis by an RDBMS optimizer. In one embodiment, a column duplicity factor is based on an analysis of distinct data rows, e.g., combinations of values within multiple columns, rather than rows of single columns. The novel system also collects separate statistics regarding the presence of null data within the rows of a column group. Separate null data statistics improve the determined result carnality used by the RDBMS optimizer because the cardinality of a relational operation's result is generally determined by the number of input rows with non-null data. The novel system includes an RDBMS optimizer that automatically identifies column groups and column groups on which workload statistics are to be generated. The parameters within a query (e.g., equi-joins, equi-selections, and projections) are analyzed by the optimizer to automatically identify the column groups. The identified columns are then registered within in a system catalog. The registered column groups are read by statistics generation procedures to identify those column groups for which workload statistics are to be collected.

19 Claims, 9 Drawing Sheets

500

| ID 510 | AGE 520 | ANNUAL SALARY 530 |
|---|---|---|
| 540  1 | 34 | 30,000 |
| 541  2 | 34 | 30,000 |
| 542  3 | 36 | 32,000 |
| 543  4 | 36 | 32,000 |
| 544  5 | 37 | 35,000 |
| 545  6 | 37 | 35,000 |
| 546  7 | 37 | 40,000 |
| *** | | |
| 547  N | 57 | 50,000 |

FIGURE 7

METHODS FOR COLLECTING QUERY WORKLOAD BASED STATISTICS ON COLUMN GROUPS IDENTIFIED BY RDBMS OPTIMIZER

This is a continuation of copending application Ser. No. 08/796,779 filed on Feb. 10, 1997 which is hereby incorporated by reference to this application.

BACKGROUND OF THE INVENTION (1) Field of the Invention

The present invention relates to the field of computer systems used for storage and retrieval of data. More specifically, the present invention relates to the field of statistics measurement systems for a relational database management system.

(2) Prior Art

Computer implemented relational database management systems (RDBMS) are well known in the art. Such database systems commonly employ data tables that contain columns and rows containing data (e.g., data values). A typical RDBMS, in addition to maintaining the data of a particular database, also maintains a set of statistics regarding the data. These statistics are useful in efficiently accessing, manipulating, and presenting the stored data.

When an RDBMS system receives a query, its optimizer analyzes the structure of the query, analyzes the various clauses (e.g. selection and join predicates) specified in the query, and examines existing data access paths (e.g. indexes) to formulate a strategy (e.g., method) of performing various relational operations (e.g., aggregation, sort, search, join, etc.) to produce the result of the query. The optimizer generally explores various strategies to find the best strategy. A best strategy is the one with lowest estimated RDBMS cost, and such strategy generally takes least amount of RDBMS resources or least amount of time or both to produce the result of the query.

RDBMS cost is generally evaluated based on input/output (I/O) operations that are required to perform necessary relational operations to produce the result of the query. Therefore, the optimizer selection criterion for the best strategy for a query is a minimum execution cost. The minimum execution cost is calculated using available statistics such as table and index cardinalities, workload statistics (e.g. statistics on columns and column groups), storage statistics and assumptions of the manner in which any relational operation typically changes the incoming data size and data distribution.

Prior RDBMS systems collect workload statistics based on single columns of data. As such, these systems make zero correlation assumption that the values of two or more columns of data are not related in any way. However, in many cases, this zero correlation assumption is incorrect. For example, in an example data table having a first column of employee age and second column of employee job position, it is possible that in general the older employees can hold higher job positions. As such, the row values in the first column correlate to the values in the second column.

In order to estimate the cost of a strategy for a query on an example employees data table asking for all employees with a certain age (e.g., 35) and certain job position (e.g., 4), the prior art systems compute a result cardinality (result_cardinality) based on the inverse of the distinct cardinality of the separate age column (DC1) multiplied by the inverse of the distinct cardinality of the separate income column (DC2) and this result is multiplied by the number of employees (#EE). The distinct cardinality of a column represents the number of distinct values within that column. See the computation of the result cardinality below:

$$\text{result\_cardinality} = (1/DC1 * 1/DC2) * \#EE$$

The estimated result cardinality represents the average number of rows likely to be produced for a query asking for all employees with a certain age and a certain job position. However, the relationship used above by the prior art system assumes that there is no correlation between the first and second columns. This assumption leads to a computation of a result cardinality value that is much smaller than what is returned in reality due to data correlation. When the above result cardinality value is used by an optimizer, its determined estimated costs for performing certain relational operations on the subject data become inaccurate. Specifically, this inaccuracy can cause the optimizer to select a query resulting in worse performance in producing the result. Therefore, what is needed is a method for collecting statistics within an RDBMS system that provides for accurate cost estimation analysis for queries involving more than one data column.

The presence of null data values within rows of a data table can lead to inaccuracies in the workload statistics, which will lead to inaccurate cost estimation analysis by the RDBMS optimizer. Most relational operations ignore incoming data rows that contain null data values in key columns. Therefore, it is important to also collect statistics about the number of rows with null data in certain columns or column groups. Prior art RDBMS systems that compute certain database statistics (e.g., distinct cardinality of a column) without regard to rows with null data produce inaccurate statistics. The inaccurate statistics can cause the RDBMS optimizer to select a sub-par strategy for a given query. Therefore, what is needed is a method for collecting statistics within an RDBMS system that provides for accurate cost estimation analysis for queries involving columns of rows with null data. The present invention provides such a system.

In prior RDBMS systems, a manual process is performed by users (e.g., system administrators) to determine which data columns of a database on which to collect statistics. In effect, in prior RDBMS systems, the user informs integrated statistics gathering procedures of the separate data columns on which workload statistics are to be gathered. However, it is often the case that the system administrators do not realize the specific mechanisms by which the RDBMS optimizer operates. Relying on users to indicate the data columns on which to collect statistics can be unreliable and inefficient. Namely, not knowing what is needed by the optimizer, the system administrator can cause the statistics gathering procedures to inefficiently over-collect statistics or fail to collect statistics on required columns. What is needed is an efficient method for identifying columns or column groups on which statistics collection is required. What is needed is such a method that does not rely on user origination of the above information.

Accordingly, the present invention provides a method and system for collecting statistics within an RDBMS system that provides for accurate cost estimation analysis for workload queries involving more than one data column. The present invention also provides a method and system for collecting statistics within an RDBMS system that provides for accurate estimated cost analysis for queries involving columns of rows with null data values. The present invention yet provides a method and system within RDBMS optimizer for identifying the columns or column groups on which statistics collection is required that does not rely on manual user identification of the column or column groups.

SUMMARY OF THE INVENTION

Methods are described for collecting query workload based statistics within a relational database management system (RDBMS) and for automatically identifying columns or groups of columns for which statistic collection is to be performed. The novel system collects workload based statistics on multi-columns rather than merely on single columns. This multi-column statistic gathering technique of the present invention provides more accurate results when the row values within the multi-columns are correlated to each other. The multi-column statistics that result from the present invention lead to better estimated cost analysis performed by an RDBMS optimizer which leads to increased likelihood of finding an optimal strategy for each query in a workload. In one embodiment, the present invention generates column group statistics which represent distinct cardinality measured over rows of multiple columns of data, rather than individual statistics on single columns ("a multi-column statistic"). In cases where the data within a column group is correlated, the multi-column result cardinality of the present invention computed using column group statistics is much more accurate compared to a result cardinality computed from statistics on individual columns using zero correlation assumption.

The novel system also collects separate statistics regarding the number of null data values within the rows of a column. Separate null data statistics improve the cost estimation analysis used by the RDBMS optimizer because the cardinality of a result produced by a relational operation is generally determined by the number of input rows with non-null data. The present invention utilizes the separate null data statistics in determining a result distinct cardinality of a column, or column group, of a data table. The null data statistics are useful in accurate estimation of cardinality of the result of a relational operation (e.g. a data search or a table join) and in accurate estimation of average cost of performing a relational operation (e.g. a data sort, a data search, a table join).

The novel system also includes an RDBMS optimizer that automatically identifies columns and groups of columns on which workload based statistics should be generated. Within the present invention, the clauses within a query such as equi-join and equi-selection predicates and projection columns are analyzed by the RDBMS optimizer to identify columns and column groups of interest. The identified columns are then registered within in a system catalog of the RDBMS. Later on, the statistics collection utility of the present invention reads the registered columns and column groups from the system catalog to identify the columns and column groups on which to generate the workload statistics. The statistics so generated are then used by the optimizer to perform subsequent estimations of the cost of performing certain relational operations in order to select a strategy for a query having the least cost.

BRIEF DESCRIPTION OF THE DRAWINGS

FIG. 7 illustrates an exemplary multi-column data table that can be used by the first embodiment of the present invention.

DETAILED DESCRIPTION OF THE INVENTION

In the following detailed description of the embodiments of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

NOTATION AND NOMENCLATURE

Some portions of the detailed descriptions which follow are presented in terms of steps, procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system (e.g., 112 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

COMPUTER SYSTEM ENVIRONMENT

Figure 1:
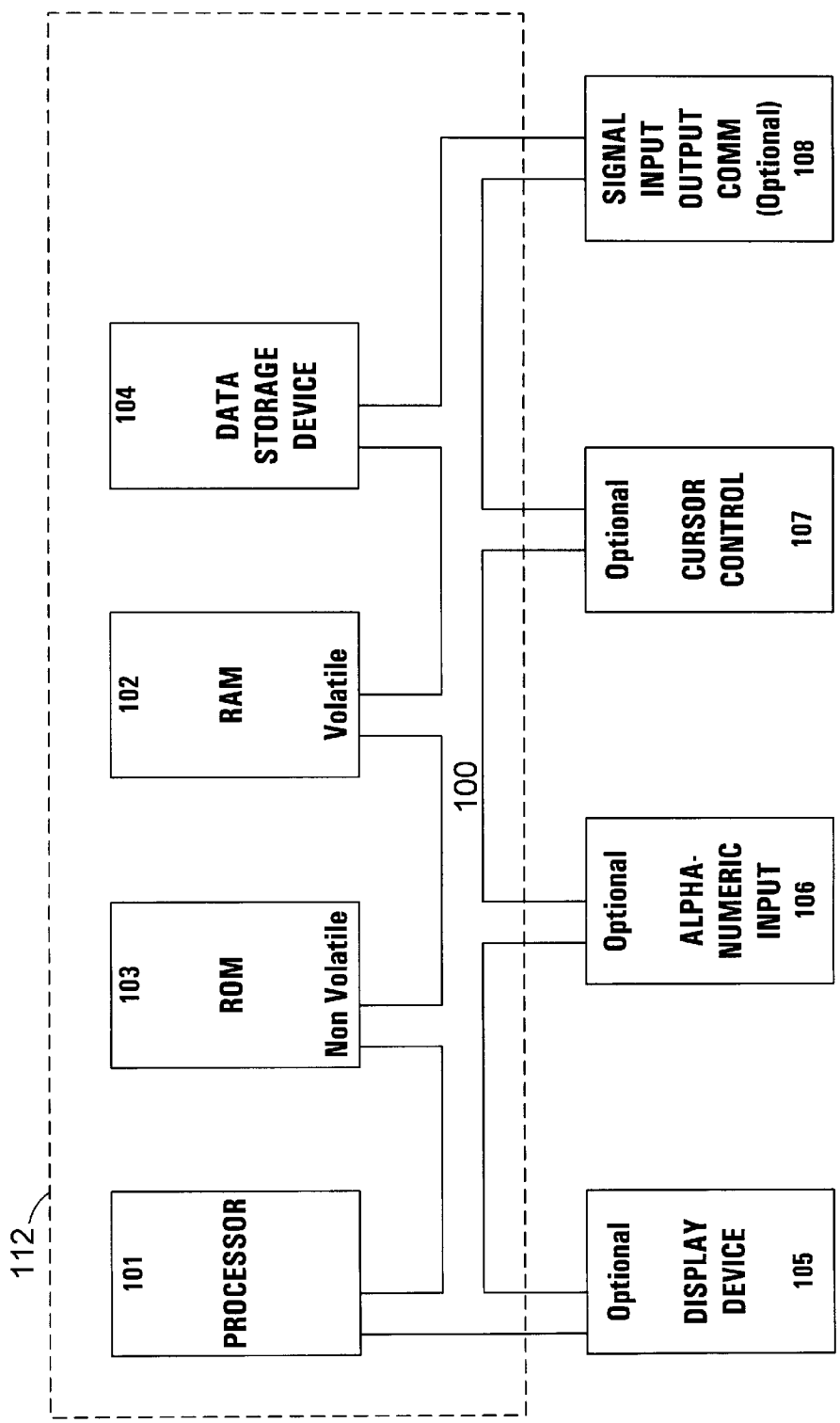
FIG. 1 illustrates a computer system used in accordance with the embodiments of the present invention.

Refer to FIG. 1 which illustrates a computer system 112. Within the following discussions of the present invention, certain processes (e.g., processes 310, 350, 410, 610, 710, 910, 1010) and steps are discussed that are realized, in one implementation, as a series of instructions (e.g., software program) that reside within computer readable memory units of system 112 and executed by processors of system 112. When executed, the instructions cause the computer system 112 to perform specific actions and exhibit specific behavior which is described in detail to follow.

In general, computer system 112 used by the present invention comprises an address/data bus 100 for communicating information, one or more central processors 101 coupled with the bus 100 for processing information and instructions, a computer readable volatile memory unit 102 (e.g., random access memory, static RAM, dynamic, RAM, etc.) coupled with the bus 100 for storing information and instructions for the central processor(s) 101, a computer readable non-volatile memory unit (e.g., read only memory, programmable ROM, flash memory, EPROM, EEPROM, etc.) coupled with the bus 100 for storing static information and instructions for the processor(s) 101. System 112 also includes a mass storage computer readable data storage device 104 (hard drive or floppy) such as a magnetic or optical disk and disk drive coupled with the bus 100 for storing information and instructions. Optionally, system 112 can include a display device 105 coupled to the bus 100 for displaying information to the computer user, an optional alphanumeric input device 106 including alphanumeric and function keys coupled to the bus 100 for communicating information and command selections to the central processor(s) 101, an optional cursor control device 107 coupled to the bus for communicating user input information and command selections to the central processor(s) 101, and an optional signal generating device 108 coupled to the bus 100 for communicating command selections to the processor(s) 101. In one exemplary implementation, system 112 is a DEC Alpha computer system by Digital Equipment Corporation, but could equally be of a number of various well known and commercially available platforms.

Figure 2:
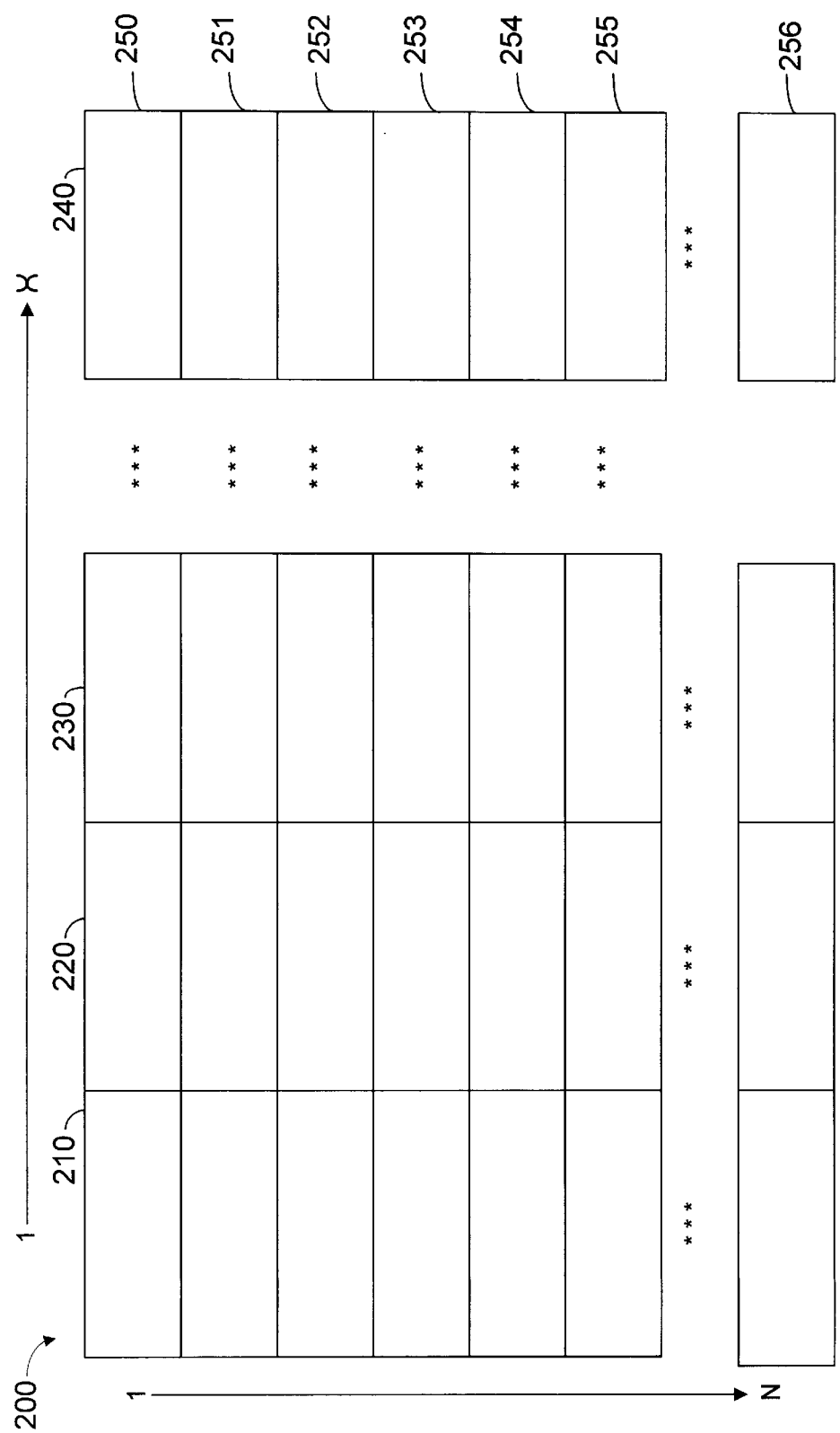
FIG. 2 is an illustration of a data table used by embodiments of the present invention including columns and rows of data.

FIG. 2 illustrates an exemplary data table 200 as used by embodiments of the present invention. It is appreciated that data table 200, as well as columns and rows of data which comprise the table 200, are stored in computer readable memory units of system 112. Exemplary table 200 includes x number of separate data columns (or "columns") 210, 220, 230, and 240. Within each column, table 200 includes n rows of data 250–256. Data ("data values") are stored within the rows of each column. A data value can be either non-null (e.g., a known value) or null (e.g., an unknown value or an empty set value). A column group is a collection of multiple columns, e.g., column 210 and 220. Herein, references to columns, rows, column groups, and data tables refer to analogous data structures as shown in FIG. 2 and as stored in computer readable memory units of system 112.

OPTIMIZER OPERATION

Database performance is directly affected by the ability of a database to efficiently access a row or rows stored on disk (e.g., 104) through input/output (e.g., I/O) operations. The greater the number of I/O operations, the longer it takes to find and retrieve rows that satisfy a query. The optimizer of the RDBMS system finds a lowest cost strategy (generally most I/O efficient) of retrieving subject data and producing result of a query. Although the optimizer can consider many strategies each with a different cost to find the one with the lowest cost, all strategies yield the same result.

Herein, cost is the estimated number of disk I/Os required to execute a strategy and produce result of a query. This is the metric used by the optimizer to find an optimal strategy, e.g., the one with the minimal cost. Main factors affecting the cost of a strategy include the following: 1) query structure, 2) query predicates (e.g. equi-selections, equi-joins, etc.), 3) result ordering or grouping, 4) access paths available (e.g. hash index, B-tree index), and 5) join methods available (e.g. sort-merge join, hash join). Any database statistics, if available, can help the RDBMS optimizer in significantly improving the accuracy of cost estimation analysis to find an optimal strategy.

In one embodiment, database statistics include cardinality statistics, workload statistics and storage statistics. Cardinality statistics include the table cardinality and index cardinality. The table cardinality represents the total number of rows in a data table. The index cardinality represents the total number of distinct keys (index values) within an index. In other words, the index cardinality is a distinct cardinality of index columns. The workload statistics include column duplicity factor and column null factor. The column duplicity factor is a ratio of the number of table rows with non-null data in a column group to the distinct cardinality of a column group. It represents average number of duplicates per distinct combination of values in a column group. The column null factor is a ratio of the number of table rows with null data in any column of a column group to the table cardinality. It represents a fraction of a data table with null data in rows of a column group.

Figure 3:
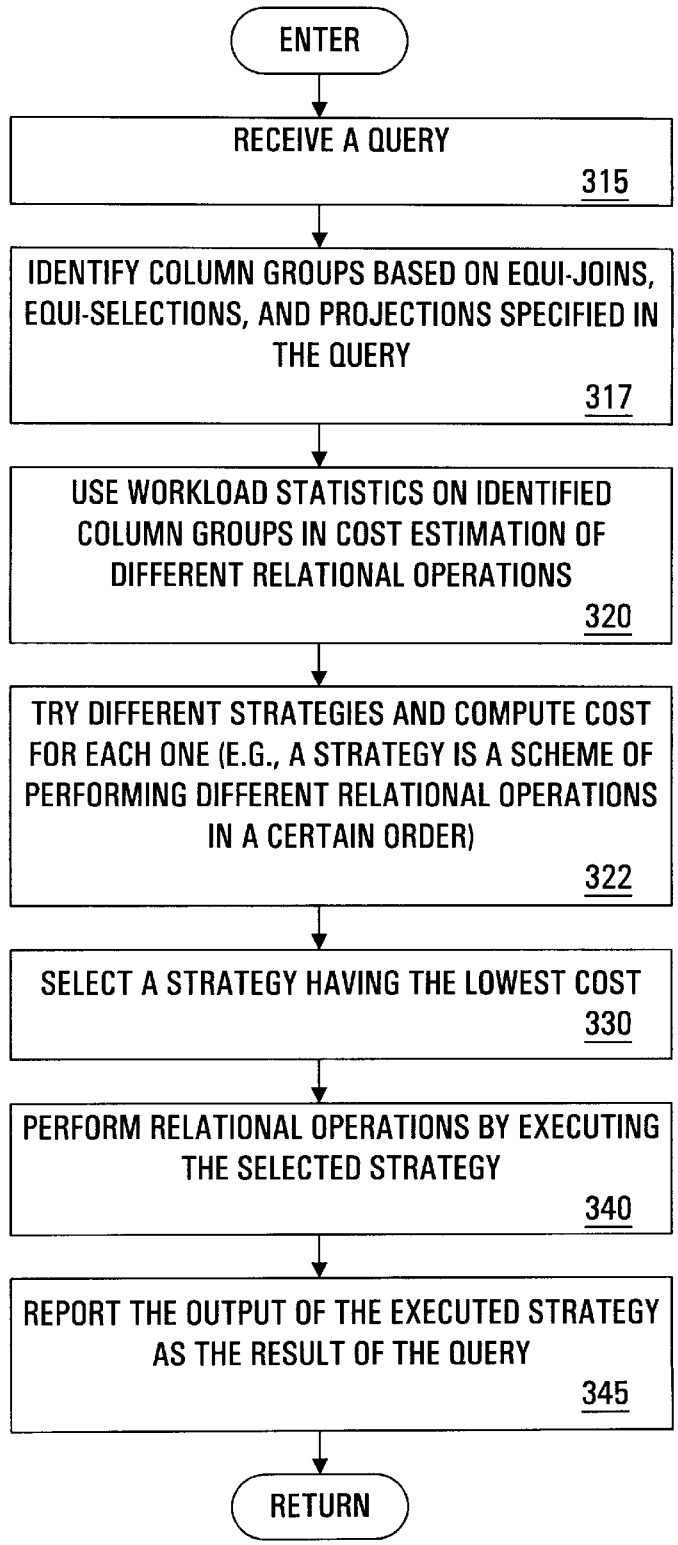
FIG. 3 is a flow diagram of steps performed by the optimizer of the RDBMS system of the present invention when selecting a lowest cost strategy for a query.

FIG. 3 illustrates an exemplary process flow 310 performed within an RDBMS system of the present invention which utilizes an optimizer. Generally, upon receiving a query, the optimizer: 1) identifies different column groups based on equi-join predicates, equi-selection predicates and projections specified in the query; 2) uses stored workload statistics on identified column groups and other stored database statistics to estimate the costs of performing different relational operations required to produce result of the query; 3) builds different strategies of executing relational operations in certain order and estimate cost for each strategy; and 4) selects the lowest cost strategy. It is appreciated that process 310 is executed over processor 101 and is stored as program instructions within computer readable memory units of system 112 (FIG. 1).

At step 315 of FIG. 3, the RDBMS system receives a query, e.g., a user request for data. The format of the received query contains certain predicates (joins, filters, and other conditions, etc.) At step 317, system 112 identifies column groups based on equi-joins, equi-selections and projections that are specified in the query. At step 320, the optimizer uses stored workload statistics on identified column groups for cost estimation of different relational operations. At step 320, the optimizer examines the query to determine the different relational operations (e.g., data access paths, sorts, filters, projections, aggregations, joins, etc.) that are needed to complete the query. At step 320, the optimizer of the RDBMS system accesses stored database statistics (cardinality/workload/storage) regarding the subject data of the query received at step 315 and uses this information to estimate the costs of performing necessary relational operations to produce the result of the query. Any of a number of well known methods can be used at step 320 for performing cost analysis of different relational operations used to satisfy the query.

With respect to determining the relational operations required to produce a result of a query, there are a number of well known retrieval strategies that the optimizer can utilize in order to perform a data search. A well known sequential retrieval strategy can be used where the RDBMS accesses the database pages for a table's logical area sequentially and reads all the rows in the table regardless of the selection expression used in the query. A number of well known index retrieval strategies can also be used, including those described below. In the database key (dbkey) retrieval, the RDBMS accesses a table data directly through a database key (e.g., logical address) row pointer. In the index retrieval, the RDBMS accesses a specific index structure (sorted or hashed) and retrieves the index keys, which include the dbkeys, of the rows. The dbkeys are then used to fetch data rows and the data is delivered in index order, if a sorted index is used. In the index only retrieval, the RDBMS accesses only the index data and the selected index contains all the table columns specified in the query and no further row fetches are necessary. The data is delivered in index order, if a sorted index is used. In the OR index retrieval, two or more sorted or hashed indexes are used that are defined on a single data table when the predicates on these indexes are combined with the logical OR in the query.

At step 322 of FIG. 3, the optimizer then attempts different strategies to implement the relational operations identified in step 320 and then computes the cost to perform each strategy. A strategy is a scheme of performing different relational operations in a certain order. By reordering the execution sequence of the relational operations, different cost values result for executing the same query. For single data tables, the optimizer finds the lowest cost retrieval strategy by evaluating the cost for each possible retrieval strategy. In one embodiment, the estimated cost for a strategy includes the cost of scanning an index and the cost of fetching data rows.

At step 330 of FIG. 3, the optimizer selects the strategy, of the strategies analyzed in step 322, that yields the lowest estimated cost solution. A number of well known optimizer processes can be used by step 330 for selecting the lowest estimated cost strategy. At step 340, the optimizer initiates the execution of the relational operations indicated by the selected strategy of step 330 to produce the result of the query. It is appreciated that each of the strategies considered at step 322, although having possibly different estimated costs, yields the same result. At step 345, system 112 reports the output of the executed strategy as the result of the query received at step 315.

OPTIMIZER IDENTIFICATION OF COLUMN GROUPS ON WHICH TO COLLECT WORKLOAD STATISTICS

The process 410 of a first embodiment of the present invention is described with reference to the flow diagram of FIG. 4A and FIG. 4B; this embodiment of the present invention provides an automatic method for identifying the column groups for which workload statistics are to be collected within an RDBMS system. Within the present invention, the column groups for which workload statistics are to be collected are identified from predicates specified in the WHERE and HAVING clauses, and projection lists specified in a GROUP BY or DISTINCT clause of each query within a query workload. In one implementation of the present invention, the equi-selection and equi-join predicates within WHERE and HAVING clauses and projection list within a GROUP BY or DISTINCT clause are used in the above process to identify column groups belonging to different data tables of a database. This embodiment of the present invention recognizes that maintaining workload statistics about such identified column groups is very important for optimizing a query because the corresponding conditions have significant influence on determining the cardinality of the query result.

For instance, if equi-selection predicates are specified in a query, the optimizer will need to be informed of the combined selectivity so that the cardinality of the result (which is produced after all equi-selections have been applied) can be computed with high accuracy. If equi-join predicates are specified in a query, the optimizer will need to be informed of the join fanout factors so that it can determine the cardinality of a joined result with high accuracy. If a projection (e.g., in a GROUP BY or DISTINCT clause) is specified in a query, the optimizer will need to be informed of how many distinct groups will be formed which will be equal to the cardinality of the projected result.

The workload statistics that are collected on the column groups identified by the optimizer in this embodiment of the present invention include a column duplicity factor and a column null factor, which are described further below. The column duplicity factor (second embodiment) provides information about the number of distinct values (e.g., the distinct cardinality) as well as the average number of duplicates per distinct combination of column values in an identified column group. The column duplicity factor, related to the result cardinality discussed above, can be used to determine the combined selectivity of equi-selection predicates, or combined join fanout factor of equi-join predicates, or the number of distinct groups which will be equal to the cardinality of the projected result. The column null factor (third embodiment) indicates the fraction of rows in a data table that have null values in any column of an identified column group. The column null factor can be used to identify a portion of the data table that would not participate in a relational operation (e.g., join, selection).

According to the present invention, when the optimizer processes a query to find the best execution strategy (e.g., FIG. 3), it also registers (if not already registered) the information about identified column groups into system catalog portions of computer readable memory units. Within the present invention, the optimizer identifies the column groups based on equi-selections, equi-joins, and projection lists in various queries in a query workload. An advantage of the present invention is that the workload statistics are collected only on the identified column groups and nothing else leading to a more efficient statistics collection procedure. This contrasts with the prior art method of relying on the user to identify the interesting columns or column groups which is a difficult task, and therefore, can be unreliable and inefficient.

Figure 4A:
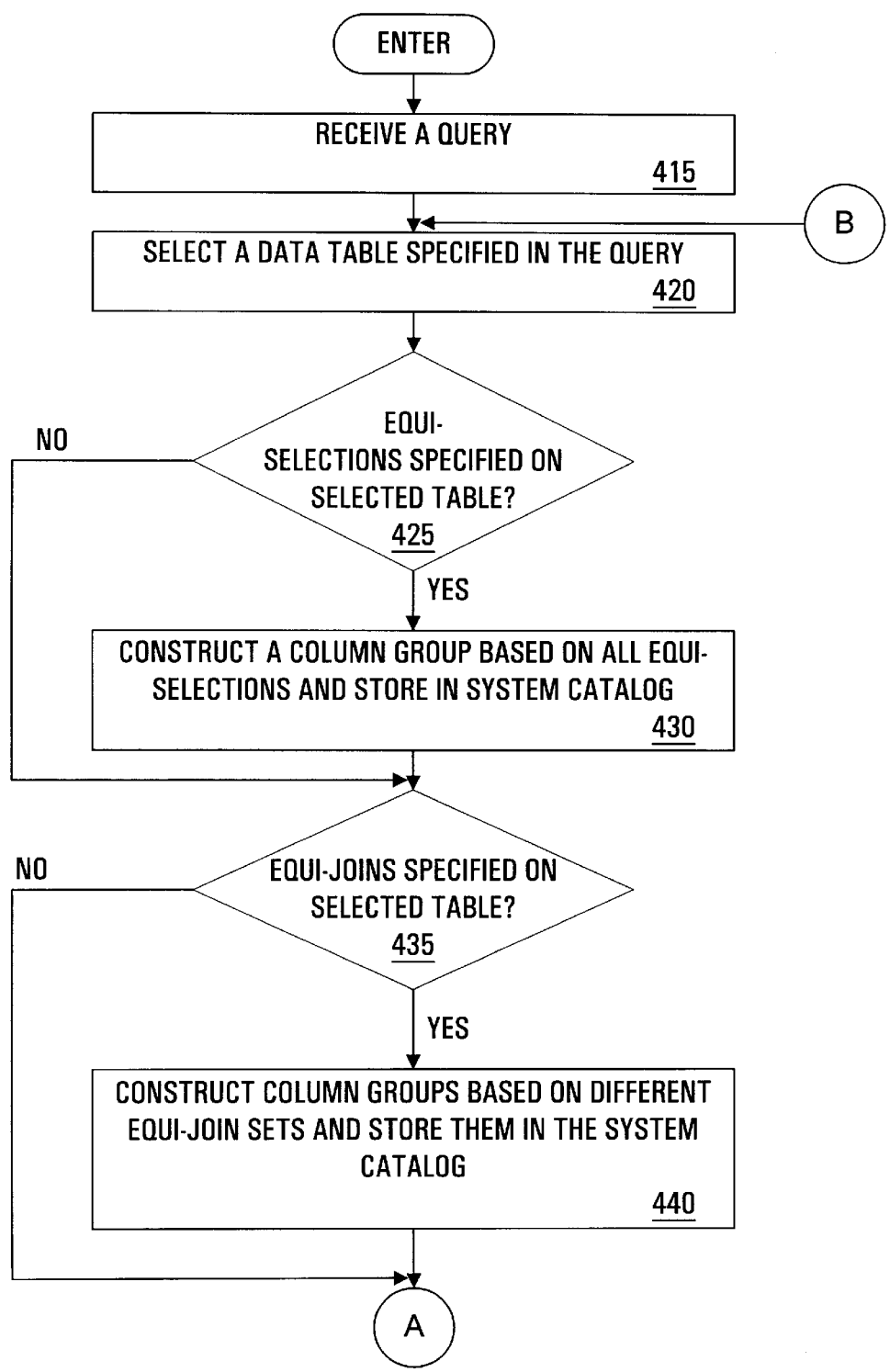
FIG. 4A and FIG. 4B illustrate a flow diagram of steps of a first embodiment of the present invention for automatic identification of columns and column groups by the RDBMS optimizer on which to collect the workload statistics.
Figure 4B:
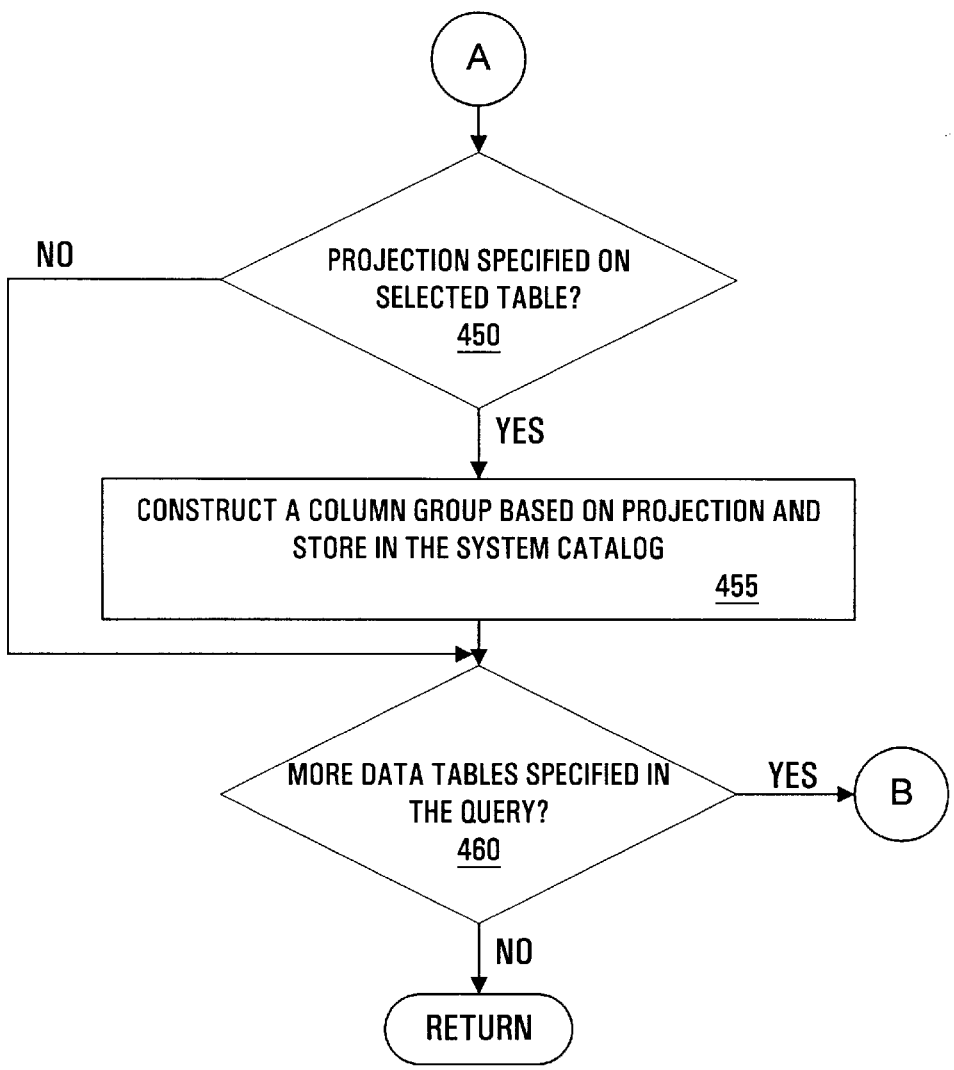

FIG. 4A and FIG. 4B illustrate a flow diagram of process 410 of this embodiment of the present invention. Process 410 resides within an optimizer implemented in accordance with the present invention and is executed over processor 101 and is stored as program instructions within computer readable memory units of system 112 (FIG. 1). Embodiments of the present invention described further below illustrate different statistics generation procedures that can be used to produce the workload statistics that are used by process 410. At step 415 of FIG. 4A, the present invention optimizer receives a query. At step 420 the present invention then selects one data table ("selected table") from a list of data tables specified within the query received at step 415. At step 425, the present invention interrogates the query to determine if any equi-selection predicates are specified on the selected table. In one embodiment, an equi-selection can exist in WHERE and HAVING clauses of the query. If not, processing continues to step 435; if so, processing continues to step 430.

The equi-selection predicate indicates a search criterion wherein the search data is specified as a particular value (or variable) and the match much be exact. An example is given below:

where employee_JOBCODE 5=and employee_AGE=40

In the above example, both employee_JOBCODE and employee_AGE are column names within the selected data table. The above equi-selection indicates that matching data are to be reported only for rows wherein the employee job and age match with the above values (e.g., 5 and 40). It is appreciated that an equi-selection can be defined with respect to a single column, or more than one columns and that the above equi-selection is exemplary only. At step 430, the present invention constructs a column group based on all equi-selection predicates specified on the selected table and stores it in the system catalog (within computer readable memory units of system 112). In the exemplary equi-selection above, step 430 identifies employee_JOBCODE and employee_AGE as a column group. Within step 430, identified column groups can contain one or two or more columns. All identified column groups are stored in the system catalog. This is performed for each equi-selection predicate specified on the selected table.

At step 435 of FIG. 4A, the present invention interrogates the query to determine if any equi-join predicates are specified on the selected table. In one embodiment, an equi-join can exist in WHERE clauses of the query. If not, processing continues to step 450 (FIG. 4B); if so, processing continues to step 440. Typically, in a join operation, data from two tables are joined together based on matching data from one or more columns. For instance, assume one data table was "Departments" and another data table was "Employees," a equi-join might join all rows of the "Departments" table and all rows of the "Employees" table that share a common department number and a common regional designation (both represented by different columns within each table). This equi-join predicate would then result in a data table that specifies all employees that worked in a particular department in a particular regional area and would also contain information about the particular department.

At step 440, the present invention constructs different column groups based on different equi-joins connecting selected data table with each of the other data tables and stores the column groups in the system catalog (within computer readable memory units of system 112). In the example above, a column group is defined by step 440 for the two columns that specify the department number and the common regional designation. All identified column groups are stored in the system catalog. This is performed for each equi-join predicate specified on the selected table. Step 450 of FIG. 4B is then entered.

At step 450 of FIG. 4B, the present invention interrogates the query to determine if any projection operations are specified on the selected table. If not, processing continues to step 460 of FIG. 4B; if so, processing continues to step 445. Projection operation is used mainly for two purposes: (1) to compute aggregates of rows of data by a projection column or columns and then build a new data table having the aggregated result; and (2) eliminating duplicate row data by creating a new data table and projecting distinct data from a given data table into the new data table. Projection or projection lists are specified in GROUP BY or DISTINCT clause of a query and is used to perform the above functions on columns of the selected table. At step 455, the present invention constructs a column group based on the projection specified on the selected table and stores the column groups in the system catalog (within computer readable memory units of system 112). Step 460 of FIG. 4B is then entered.

At step 460, the present invention examines the query received at step 415 to determine if more data tables are specified within the query that have not yet been processed by process 410. If so, processing returns to step 420 of FIG. 4A to select a next data table; if not, process 410 ends.

It is appreciated that the determined set of column groups identified (from steps 430, 440, and 455) can include one or more columns on which single column or multi-column workload statistics are to be collected. At the completion of process 410, the present invention stores the columns and/or column groups selected at steps 430, 440, and 455 into the system catalog portion of computer readable memory units of system 112 provided they were not previously stored.

When a statistics collection utility runs, it reads the column groups stored in the system catalog of the RDBMS system, and collects the workload statistics for each column group. By identifying a set of column groups based on the various clauses specified within each query of a query workload, the present invention advantageously provides an automatic mechanism for determining certain data in the database for which statistics are to be collected. The availability of the workload statistics on identified columns is deemed to be highly relevant to the cost estimation analysis performed by the optimizer to find an optimal strategy for each query in the query workload.

STATISTICS GENERATION PROCEDURE

Figure 5:
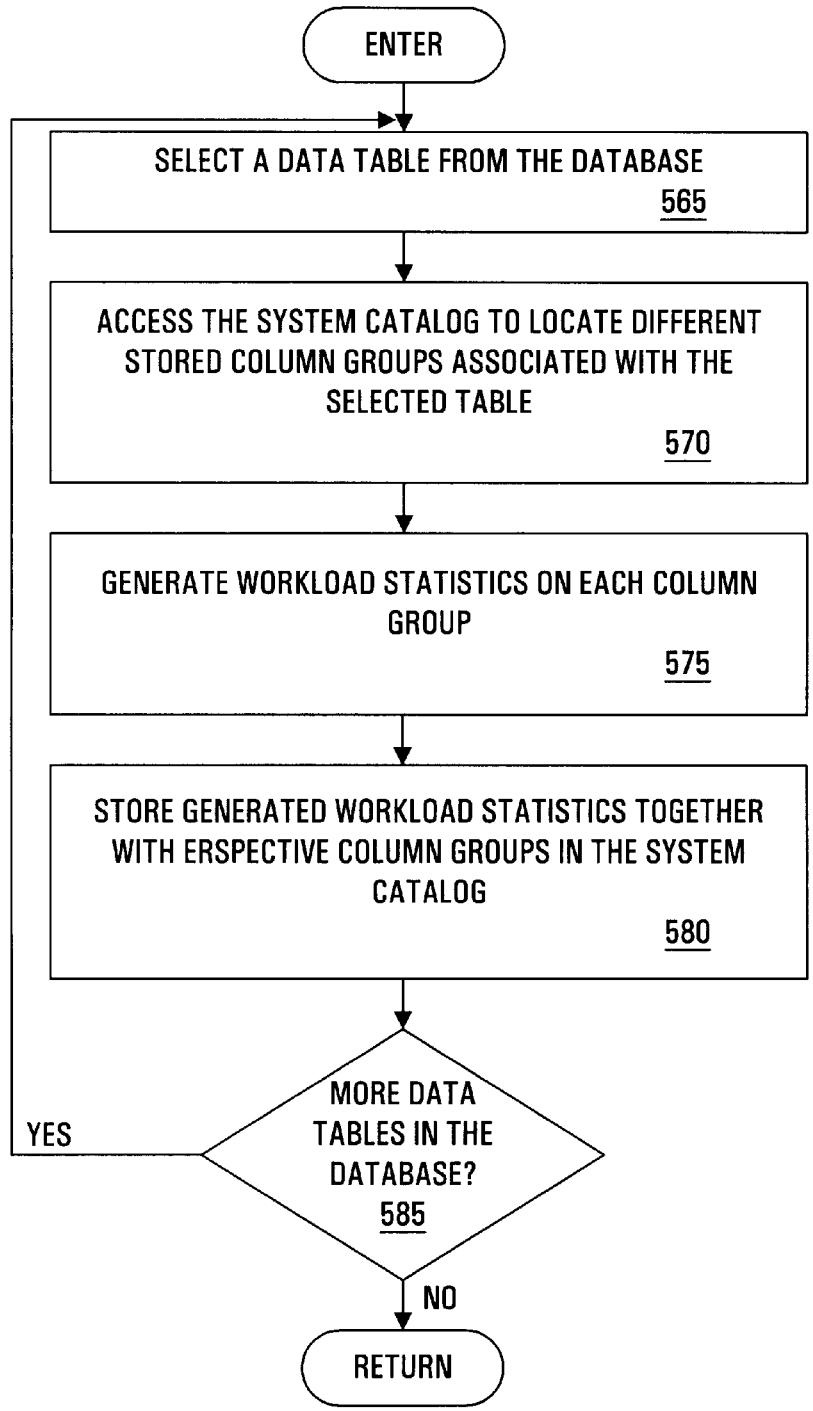
FIG. 5 is a flow diagram of steps performed by statistics generation procedures of the present invention to generate workload statistics.

FIG. 5 illustrates steps of the statistics generation process 560 which operates to construct the statistics used in process flow 310 (FIG. 3). It is appreciated that process 560 typically operates in the background of the RDBMS system in an effort to avoid interference with the RDBMS system's execution of other relational operations. In this respect, process 560 and process 310 are asynchronous. Process 560 is executed over processor 101 and is stored as program instructions within computer readable memory units of system 112 (FIG. 1). Process 560 commences at step 565 where a particular data table is selected ("selected table").

At step 570 of FIG. 5, process 560 accesses the system catalog within the RDBMS system (e.g. a portion of memory unit 102) to obtain a list of identified column groups (on which to collect workload statistics) associated with a selected data table. At step 575, the workload statistics (column duplicity factor and column null factor) are generated for each of the identified column groups (e.g., identified by step 410 above). This is performed for each identified column group in the system catalog. At step 580, the generated workload statistics are then stored together with respective column groups into the system catalog of the RDBMS system for use by process 310 (FIG. 3) when needed.

At step 585, the present invention checks if more data tables are present in the database. If so, process 560 returns to step 565 to select a new data table; if not, process 560 returns (to be executed at a later predetermined time).

It is appreciated that the following two embodiments of the present invention operate within step 575 to provide, respectively, collection of (1) workload-based multi-column non-null statistic (column duplicity factor), and (2) workload-based multi-column null statistic (column null factor) for each of the identified column groups in the database. It is appreciated that the embodiment of the present invention represented by process 410 provides methods for identifying the data for which workload statistics are to be collected. This embodiment of the present invention places identifiers of this data within the system catalog which is read by step 570 of process 560, although other memory locations can also be used within the scope of the present invention.

WORKLOAD-BASED MULTI-COLUMN NON-NULL STATISTIC (COLUMN DUPLICITY FACTOR) COMPUTATION PROCEDURE

Process 610 of the second embodiment of the present invention operates within the statistics generation procedures of an RDBMS system (process 560). This embodiment recognizes that in many instances within a database system, the distribution of values in one column can correlate to the values of another column. Conventional RDBMS systems assume that there is no correlation between two or more columns when determining overall estimated result cardinalities of a relational operation that includes two or more columns. As used herein, the result cardinality represents the average number of rows of a data table that result from a particular relational operation (e.g., a search, projection, join, etc.).

The zero-correlation assumption made by the conventional systems usually causes a large percentage error in the estimation of query solution costs and cardinalities when strong correlation exists between multiple columns on which relational operations are performed, such as selections, projections, and joins. Large errors in solution costs lead the optimizer to select a sub-optimal strategy for a query. The first embodiment of the present invention avoids the above problem through automatic identification of column groups based on a query workload, and collecting workload statistics on single columns and multiple columns (multi-column statistics) as a group, rather than collecting statistics merely on individual columns. In effect, the first embodiment of the present invention provides a mechanism for capturing the correlation between columns by collecting statistics on multiple columns as a group.

Figure 6:
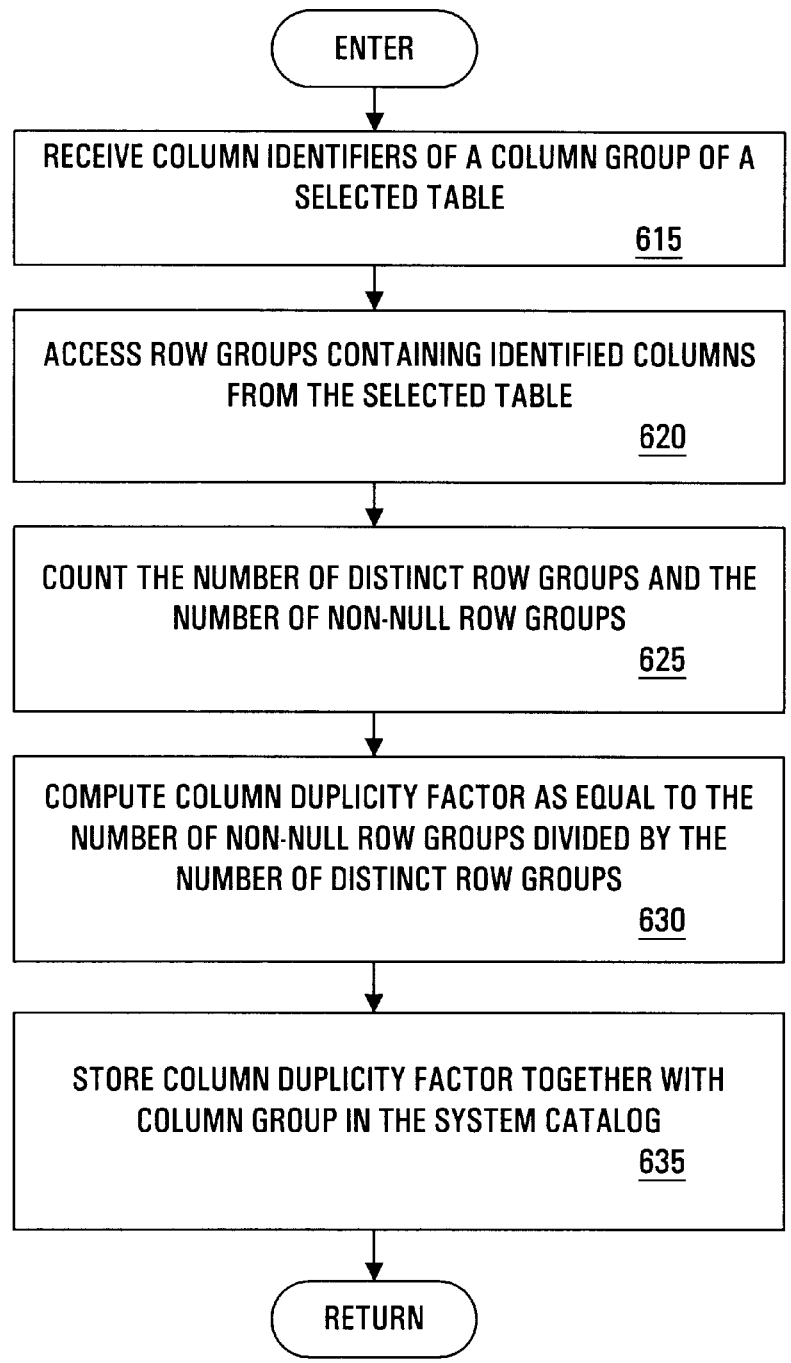
FIG. 6 illustrates a flow diagram of steps of a second embodiment of the present invention for generating non-null workload statistics (e.g., the column duplicity factor), which is a multi-column statistic, on identified column groups.

FIG. 6 illustrates a process flow 610 of steps of the second embodiment of the present invention. Process 610 is executed over processor 101 and is stored as program instructions within computer readable memory units of system 112 (FIG. 1). At step 615, the present invention reads the system catalog space of a computer readable memory unit of system 112 to receive an indication of certain column groups (column identifiers) on which workload statistics need to be collected. According to a preferred embodiment of the present invention, this information originates from an automatic analysis (e.g., process 410) performed by an optimizer of one embodiment of the present invention. Alternatively, this information can be user originated with respect to the first embodiment of the present invention.

By way of example, FIG. 7 illustrates a data table 500 comprising three columns: 1) an employee identification number column 510; 2) an employee age column 520; and 3) an annual salary column 530. The data table 500 contains "n" rows 540–547. In step 615 of FIG. 6, the present invention receives column identifiers of a column group for which a column duplicity factor needs to be computed, e.g., on the age column 520 and the annual salary column 530 of data table 500.

At step 620 of FIG. 6, the present invention accesses row groups containing identified columns (identified in step 615) from the selected table. A row group includes the corresponding rows of each identified column of the data table. The identified columns on which workload statistics are to be collected are referred to as "column groups." Each of the age and annual salary entries of a particular row, e.g., row 542, of data table 500 is a corresponding row group. In the example of FIG. 7, the rows are corresponding because they belong to a same employee identification number. The following are further examples of row groups in accordance with the example of FIG. 7: 1) 34/30,000 of row 541; 2) 37/35,000 of row 544; and 3) 37/40,000 of row 546.

At step 625 of FIG. 6, the present invention then determines the number of unique row groups of the row groups accessed in step 620. This statistic is called the distinct cardinality of the columns identified in step 615 (e.g., the distinct cardinality of the column group). Also at step 625, the present invention counts the total number of non-null row groups. In the example of FIG. 7, assuming n=8, the number of non-null row groups is 8.

At step 625, it is appreciated that corresponding data values of multiple columns are considered in determining the number of distinct row groups within the present invention. Therefore, the result cardinality of the column group is dependent on the data of multiple columns. In the example of FIG. 7, assuming n=8, the number of distinct row groups is 5 and they are: 34/30,000; 36/32,000; 37/35,000; 37/40,000; and 57/50,000. With reference to the above example, the present invention determines the number of distinct "pairs" between the age and income columns of data table 500. At step 625, the multi-column distinct cardinality statistic of 5 is reported as the number of distinct row groups in the column group including column 520 and column 530.

At step 630, the column duplicity factor (a multi-column statistics) is computed by dividing the number of non-null row groups by the number of distinct row groups in the selected table. The column duplicity factor represents the average number of rows returned based on a query of the data table that includes a specific selection values of the columns identified in step 615. In the example of FIG. 7, the column duplicity factor represents the average number of rows matching a query including a specific age value and a specific income value. Assuming n=8, the result cardinality of FIG. 7 reported by step 630 is 8/5 or 1.6. At step 625, the column duplicity factor (a multi-column statistic) determined at step 630 is stored as workload-based statistic corresponding to the columns that were identified in step 615. These values are stored and indexed in computer readable memory units of system 112. As described with reference to FIG. 3, the optimizer utilizes these workload statistics to perform accurate cost estimations in its cost analysis in determining the lowest cost strategy for performing a query.

A Comparison With Single Column Method. To illustrate the increased accuracy of multi-column workload statistics of the present invention, a comparison with workload statistics determination using single columns is presented. With reference to the example of FIG. 7, the age selectivity of column 520 is one over the column's distinct cardinality or 1/4. The income selectivity of column 530 is one over the column's distinct cardinality or 1/5. The overall selectivity is computed below:

$$
\begin{aligned}
\text{overall selectivity} &= \text{age selectivity} * \text{income selectivity} \\
\text{overall selectivity} &= (1/4) * (1/5) \\
&= 1/20
\end{aligned}
$$

The result cardinality of the two columns is expressed as the overall selectivity times the table cardinality which represents the number of rows of the data table 500. In this example n=8, so the result cardinality computed from single column statistics is expressed below:

$$\begin{aligned}\text{result cardinality} &= (1/20) * (8)\\ &= 0.4\end{aligned}$$

Based on single column statistics, the average number of rows a query (e.g., SELECT FROM DATA TABLE 500 WHERE AGE=x AND INCOME=y) is expected to locate based on a selection of both age and income is 0.4. However, under the present invention multi-column workload statistics, the average number of rows a query is expected to locate based on a selection of both age and income is 1.6. The multi-column workload statistic of the present invention is much more accurate over the single column derived workload statistic because in the example case of FIG. 7, and in many instances, the data within the columns are correlated. This correlation leads to a more accurate result cardinality value, as expressed in the present invention, but ignored in the single column derivation method of conventional systems.

By having more accurate result cardinalities, the second embodiment of the present invention provides an RDBMS optimizer with a more accurate estimated costs for optimal strategy selection. With more accurate costs, an optimal strategy is more likely to be selected by the optimizer and a reduced instance of sub-optimal strategy selection is provided by the present invention. With the present invention, more accurate cost estimation by the optimizer is possible because more accurate information is available regarding: (1) how many rows on average are selected from a given data table; and/or (2) how many rows on average going to participate in a relational operation (e.g., a join).

COMPUTATION PROCEDURE TO PROVIDE WORKLOAD-BASED MULTI-COLUMN NULL STATISTIC (COLUMN NULL FACTOR)

The process 710 of a third embodiment of the present invention, like the second embodiment (process 610), operates within the statistics generation procedures of an RDBMS system (process 560). The process 710 of the third embodiment of the present invention is described with reference to the flow diagram of FIG. 8 and the exemplary data tables of FIG. 7. The third embodiment of the present invention maintains separate workload statistics regarding the number of rows with null data values in a column group. Separating rows with null data from rows with non-null data is important because rows with nulls do not participate in most of the relational operations performed within an RDBMS. Therefore, as recognized by the third embodiment of the present invention, the cardinality (e.g., the number of rows) of a result produced by a relational operation is generally determined by the number of input rows with non-null data.

Figure 8:
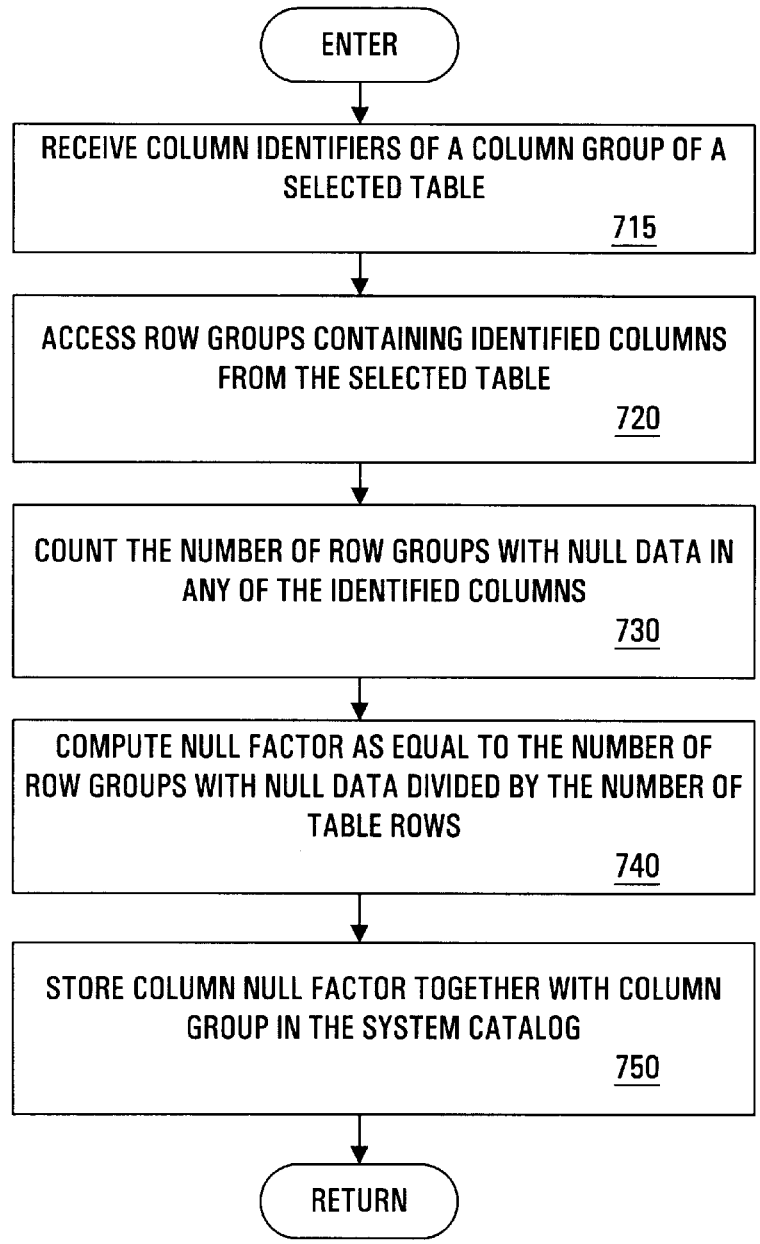
FIG. 8 illustrates a flow diagram of steps of a third embodiment of the present invention for generating null workload statistics (e.g., the column null factors) on identified column groups.

FIG. 8 illustrates a process 710 performed by an implementation of the third embodiment of the present invention for computing multi-column null statistics for a column group. Process 710 is executed over processor 101 and is stored as program instructions within computer readable memory units of system 112 (FIG. 1). FIG. 8 is described with respect to an example data table 500 of FIG. 7 where n is 100. In this example, the age column 520 contains null data rows for 50 of the employees. Also in this example, there are only 20 distinct age entries in age column 520, so it is appreciated that the initial distinct cardinality (e.g., without consideration of null data values) for column 520 is 100/20 or 5.0.

With reference to FIG. 8, at step 715, the present invention receives column identifiers of a column group of a selected table. In effect, system 112 reads the system catalog space of a computer readable memory unit of system 112 to receive the column group identifiers on which to collect workload-based null statistics of the selected table. According to a preferred embodiment of the present invention, this information originates from an automatic analysis (e.g., process 410) performed by an optimizer of one embodiment of the present invention. Alternatively, this information can be user originated with respect to the first embodiment of the present invention. For instance, the present invention receives an indication that workload statistics are to be collected based on the age column 520 of data table 500 (FIG. 7). At step 720, the present invention accesses the corresponding row groups of the data table containing the identified column groups.

At step 730, the present invention counts the number of row groups with null data in any of the identified columns. In one embodiment, at step 730, system 112 examines the individual entries of the corresponding rows groups to determine the number of row groups with null data in any of the identified column groups. For instance, at step 730, the present invention performs a search, or other equivalent operation, to determine the number of null rows within the identified column and records this value as a null data statistic for the identified column. This is done for each of the identified columns for the selected table. With reference to column 520 (FIG. 7), the present invention performs a search and determines that 50 of the rows of identified column 520 contain null data values.

At step 740 of FIG. 8, the present invention utilizes the number of null rows determined in step 730 and the number of table rows to determine the column null factor for the identified column. At step 740, system 112 computes the column null factor as equal to the number of row groups with null data divided by the number of table rows. In one embodiment, this is computed for all identified columns of the selected table. For instance, with respect to column 520, the present invention divides the number of null rows (50) by the total number of table rows (100) of column 520 to compute a column null factor of 0.5.

In the example, the age column 520 contains null data rows for 50 of the employees out of a total of 100. Also, in the example, there are only 20 distinct values in the age column 520. It is appreciated that without the null statistic, the initial result cardinality for an equi-selection on column 520 is 100/20 or 5.0. By collecting null statistic (column null factor), the present invention gives a much more accurate final result cardinality by multiplying the initial result cardinality by one minus the column null factor. This is shown below:

$$\begin{aligned}\text{final result cardinality} &= \text{initial result cardinality} * (1 - \text{null factor})\\ &= 5.0 * (1 - 0.5)\\ &= 2.5\end{aligned}$$

The final result cardinality gives a much more accurate estimate of the average number of rows of column 520 that are likely to have any particular, age value, considering rows with null values within column 520.

At step 750 of FIG. 8, the third embodiment of the present invention stores the determined column null factor in a computer readable memory unit as a workload-based null statistic for the identified column group of the selected table.

For example, the null factor of 0.5 is then recorded for column 520. By separating out the rows with non-null data, the present invention gives a more accurate final result cardinality which indicates that, on average, 50/20 or 2.5 employees have the same age in our current example. On average, a query of column 520 for a particular age would result in 2.5 rows identified, not 5.0 as indicated by the initial result cardinality that does not take into consideration the presence of null data rows.

EXEMPLARY USE OF WORKLOAD STATISTICS

The following material illustrates the manner in which the workload statistics (e.g., column duplicity factor and column null factor) are used to compute the result cardinality of the following relational operations: 1) equi-selection, 2) equi-join, and 3) projection.

In this example, two data tables exists each with one column group. Refer to the column group in the first table as CG1 and the column group in the second table as CG2. Herein, the column duplicity factor and column null factor based on CG1 is denoted as CDF1 and CNF1, and the column duplicity factor and column null factor based on CG2 is denoted as CDF2 and CNF2. Also, the cardinality of first table (i.e. number of rows) is denoted as TC1, and the cardinality of second table is denoted as TC2.

If equi-selection predicates are specified on all columns in CG1 then the result cardinality of an equi-selection operation on the first table is estimated as equal to CDF1. Note that CDF1 represents the average number of duplicates per distinct value of CG1. An equi-selection over CG1 is nothing but selecting a distinct value of CG1, and therefore, the result cardinality of such an operation is expected to be equal to CDF1.

Similarly, if equi-selection predicates are specified on all columns in CG2 then the result cardinality of an equi-selection operation on the second table is estimated as equal to CDF2.

If a projection is specified on all columns in CG1 then the result cardinality of a projection operation on the first table is estimated as equal to TC1*(1-CNF1)/CDF1. Note that TC1*(1-CNF1)/CDF1 represents the distinct cardinality of CG1. A projection over CG1 is nothing but selecting all distinct values in CG1, and therefore, the result cardinality of such an operation is expected to be equal to TC1*(1-CNF1)/CDF1.

Similarly, if a projection is specified on all columns in CG2 then the result cardinality of a projection operation on the second table is estimated as equal to TC2*(1-CNF2)/CDF2.

If equi-join predicates are specified between all columns in CG1 and CG2 then the result cardinality of an equi-join operation between first and second tables is estimated as follows: The quantity TC1*(1-CNF1)/CDF1 is denoted as DC1, and similarly the quantity TC2*(1-CNF2)/CDF2 is denoted as DC2. Herein DC1 and DC2 represent, respectively, the distinct cardinality of CG1 and CG2. The result of the equi-join operation based on CG1 and CG2 is estimated as equal to MIN (DC1, DC2)*CDF1*CDF2. Herein MIN is a function that chooses the minimum value between DC1 and DC2.

CONCLUSION

The embodiments of the present invention, a method for automatic identification of column groups based on a query workload by the RDBMS optimizer, a method for collecting multi-column non-null statistic on identified column groups, and a method for collecting multi-column null statistics on identified column groups, are thus described. While the present invention has been described in particular embodiments, it should be appreciated that the present invention should not be construed as limited by such embodiments, but rather construed according to the below claims.

What is claimed is:

1. In a relational database management system having a processor coupled to a bus and a computer readable memory unit coupled to said bus, a computer implemented method for determining a workload statistic, said method comprising the steps of:

a) accessing a predetermined portion of said computer readable memory unit to determine an identified first column of data within a data table;

b) determining the number of rows of said first column that contain null data;

c) determining a first workload statistic associated with said first column, wherein said workload statistic is compensated for contribution of said rows of said first column that contain null data; and d) storing said first workload statistic determined in step c) in a predetermined portion of said computer readable memory unit for use by an optimizer of said relational database management system.

2. A method as described in claim 1 further comprising the step of e) performing a cost analysis of executing a query according to a number of different strategies to determine a least cost execution strategy, said query involving said first column, wherein said step e) is performed by said optimizer which accesses and uses said workload statistic determined in step c) in performing said cost analysis.

3. A method as described in claim 1 wherein said first workload statistic is a column null factor of said first column and wherein said step c) comprises the steps of:

c1) determining the number of rows of said first column that contain null data;

c2) determining the total number of rows of said first column; and c3) dividing the number of rows of said first column that contain null data by the total number of rows of said first column to generate said column null factor for said first column.

4. A method as described in claim 1 wherein said first workload statistic is a result cardinality of said first column and wherein said step c) comprises the steps of:

c1) determining the number of rows of said first column that contain null data;

c2) determining the total number of rows of said first column;

c3) dividing the number of rows of said first column that contain null data by the total number of rows of said first column to generate said column null factor for said first column; and c4) determining said result cardinality based on an initial cardinality of said first column and said column null factor.

5. A method as described in claim 1 wherein said predetermined portion of said computer readable memory unit comprises a system catalog of said relational database management system.

6. In a relational database management system having a processor coupled to a bus and a computer readable memory unit coupled to said bus, a computer implemented method for identifying data for which workload statistics are to be collected, said method comprising the steps of:

a) receiving a query to be processed by said relational database management system, said query having an associated data table;

b) responsive to step a), invoking an optimizer within said relational database management system to automatically identify sets of columns and column groups associated with said data table of said query;

c) said optimizer registering said set of columns and column groups within a predetermined portion of said computer readable memory unit for use by statistics generation processes of said relational database management t system; and d) accessing said predetermined portion of said computer readable memory unit and collecting workload statistics on said set of columns and column groups registered by said step c).

7. A method as described in claim 6 wherein said step b) comprises the step of identifying said set of columns and column groups from column identifications of said data table, said column identifications located within equi-selection predicates of WHERE clauses in said query.

8. A method as described in claim 6 wherein said step b) comprises the step of identifying said set of columns and column groups from column identifications of said data table, said column identifications located within equi-selection and/or equi-join predicates of HAVING clauses in said query.

9. A method as described in claim 6 wherein said step b) comprises the step of identifying said set of columns and column groups from column identifications of said data table, said column identifications located within projection lists of GROUP BY clauses in said query.

10. A method as described in claim 6 wherein said step b) comprises the step of identifying said set of columns and column groups from column identifications of said data table, said column identifications located within projection lists of DISTINCT clauses in said query.

11. A computer system comprising:

a bus;

a processor coupled to a bus; and a computer readable memory unit coupled to said bus, said computer readable memory having stored therein instructions that when executed implement a method of determining a workload statistic, said method comprising the steps of:

a) accessing a predetermined portion of said computer readable memory unit to determine an identified first column of data within a data table;

b) determining the number of rows of said first column that contain null data;

c) determining a first workload statistic associated with said first column, wherein said workload statistic is compensated for contribution of said rows of said first column that contain null data;

d) storing said first workload statistic determined in step c) in a predetermined portion of said computer readable memory unit for use by an optimizer of said relational database management system; and e) performing a cost analysis of executing a query according to a number of different strategies to determine a least cost execution strategy, said query involving said first column, wherein said step e) is performed by said optimizer which accesses and uses said workload statistic determined in step c) in performing said cost analysis.

12. A method as described in claim 11 wherein said first workload statistic is a column null factor of said first column and wherein said step c) comprises the steps of:

c1) determining the number of rows of said first column that contain null data;

c2) determining the total number of rows of said first column; and c3) dividing the number of rows of said first column that contain null data by the total number of rows of said first column to generate said column null factor for said first column.

13. A method as described in claim 11 wherein said first workload statistic is a result cardinality of said first column and wherein said step c) comprises the steps of:

c1) determining the number of rows of said first column that contain null data;

c2) determining the total number of rows of said first column;

c3) dividing the number of rows of said first column that contain null data by the total number of rows of said first column to generate said column null factor for said first column; and c4) determining said result cardinality based on an initial cardinality of said first column and said column null factor.

14. A method as described in claim 11 wherein said predetermined portion of said computer readable memory unit comprises a system catalog of said relational database management system.

15. A computer system comprising:

a bus;

a processor coupled to said bus; and a computer readable memory unit coupled to said bus, said computer readable memory unit having stored therein instructions that when executed implement a method of identifying data for which workload statistics are to be collected, said method comprising the steps of:

a) receiving a query to be processed by said relational database management system, said query having an associated data table;

b) responsive to step a), invoking an optimizer within said relational database management system to automatically identify sets of columns and columns groups associated with said data table of said query;

c) said optimizer registering said set of columns and column groups within a predetermined portion of said computer readable memory unit for use by statistics generation processes of said relational database management system; and d) accessing said predetermined portion of said computer readable memory unit and collecting workload statistics on said set of columns and column groups registered by said step c).

16. A computer system as described in claim 15 wherein said step b) of said method comprises the step of identifying said set of columns and columns groups from column identifications of said data table, said column identifications located within equi-selection predicates of WHERE clauses said query.

17. A computer system as described in claim 15 wherein said step b) of said method comprises the step of identifying said set of columns and columns groups from column identifications of said data table, said column identifications located within equi-selection and/or equi-join predicates of HAVING clauses said query.

18. A computer system as described in claim 15 wherein said step b) of said method comprises the step of identifying said set of columns and columns groups from column identifications of said data table, said column identifications located within projection lists of GROUP BY clauses said query.

19. A computer system as described in claim 15 wherein said step b) of said method comprises the step of identifying said set of columns and columns groups from column identifications of said data table, said column identifications located within projection lists of DISTINCT clauses said query.

* * * * *

UNITED STATES PATENT AND TRADEMARK OFFICE
CERTIFICATE OF CORRECTION

| | |
|---|---|
| PATENT NO. | : 6,029,163 |
| APPLICATION NO. | : 09/164400 |
| DATED | : February 22, 2000 |
| INVENTOR(S) | : Mohamed Ziauddin |

It is certified that error appears in the above-identified patent and that said Letters Patent is hereby corrected as shown below:

Claim 6, column 17, line 15, please delete "agement t system" and insert --agement system--

Signed and Sealed this
Third Day of July, 2012

David J. Kappos
*Director of the United States Patent and Trademark Office*